(12) United States Patent
Grafi

(10) Patent No.: US 12,688,512 B2
(45) Date of Patent: Jul. 21, 2026

(54) SYSTEM AND METHODS FOR CUSTOMER QUALITY PREDICTION

(71) Applicant: TGRES LLC, New York, NY (US)

(72) Inventor: Talma Tal Grafi, New York, NY (US)

(73) Assignee: TGRES LLC, New York, NY (US)

( * ) Notice: Subject to any disclaimer, the term of this patent is extended or adjusted under 35 U.S.C. 154(b) by 40 days.

(21) Appl. No.: 18/107,475

(22) Filed: Feb. 8, 2023

(65) Prior Publication Data

US 2023/0196392 A1      Jun. 22, 2023

Related U.S. Application Data

(63) Continuation-in-part of application No. 17/584,293, filed on Jan. 25, 2022, now abandoned, and a continuation-in-part of application No. 17/529,441, filed on Nov. 18, 2021, now abandoned.

(51) Int. Cl.
*G06Q 30/02* (2023.01)
*G06Q 30/0202* (2023.01)
(52) U.S. Cl.
CPC ................................ *G06Q 30/0202* (2013.01)
(58) Field of Classification Search
None
See application file for complete search history.

(56) References Cited

U.S. PATENT DOCUMENTS

| | | | | |
|---|---|---|---|---|
| 2006/0047441 A1* | 3/2006 | Homayouni | ........... | G16B 50/00 |
| | | | | 702/19 |
| 2010/0161379 A1* | 6/2010 | Bene | .................. | G06Q 30/0202 |
| | | | | 705/7.31 |
| 2010/0217734 A1* | 8/2010 | Lv | ........................... | G06Q 30/02 |
| | | | | 706/25 |
| 2021/0280295 A1* | 9/2021 | Katz | ....................... | G16H 15/00 |
| 2022/0036302 A1* | 2/2022 | Cella | ....................... | G06N 20/00 |

* cited by examiner

*Primary Examiner* — Alan Torrico-Lopez
(74) *Attorney, Agent, or Firm* — Sigma Law Group LLC

(57) ABSTRACT

Apparatus and associated methods relate to determining scores rating historical customer quality, training a predictive analytic model to recognize historical customer quality determined as a function of ranking the scores, and predicting future customer quality based on the model. In an illustrative example, quality may be a vector quantity representing multi-source data. In some examples, the predictive analytic model may be trained to recognize a historical customer as a member of a subset of customers. For example, the model may be trained to recognize a customer subset selected based on a quality threshold characterizing the subset as good. In various embodiments, the predictive analytic model may be a neural network, permitting prediction based on weights adapted by machine learning techniques to learn which data sources are optimal predictors. Various examples may advantageously predict a customer quality trend as a function of time, permitting decisions based on predicted future customer quality.

19 Claims, 6 Drawing Sheets

400

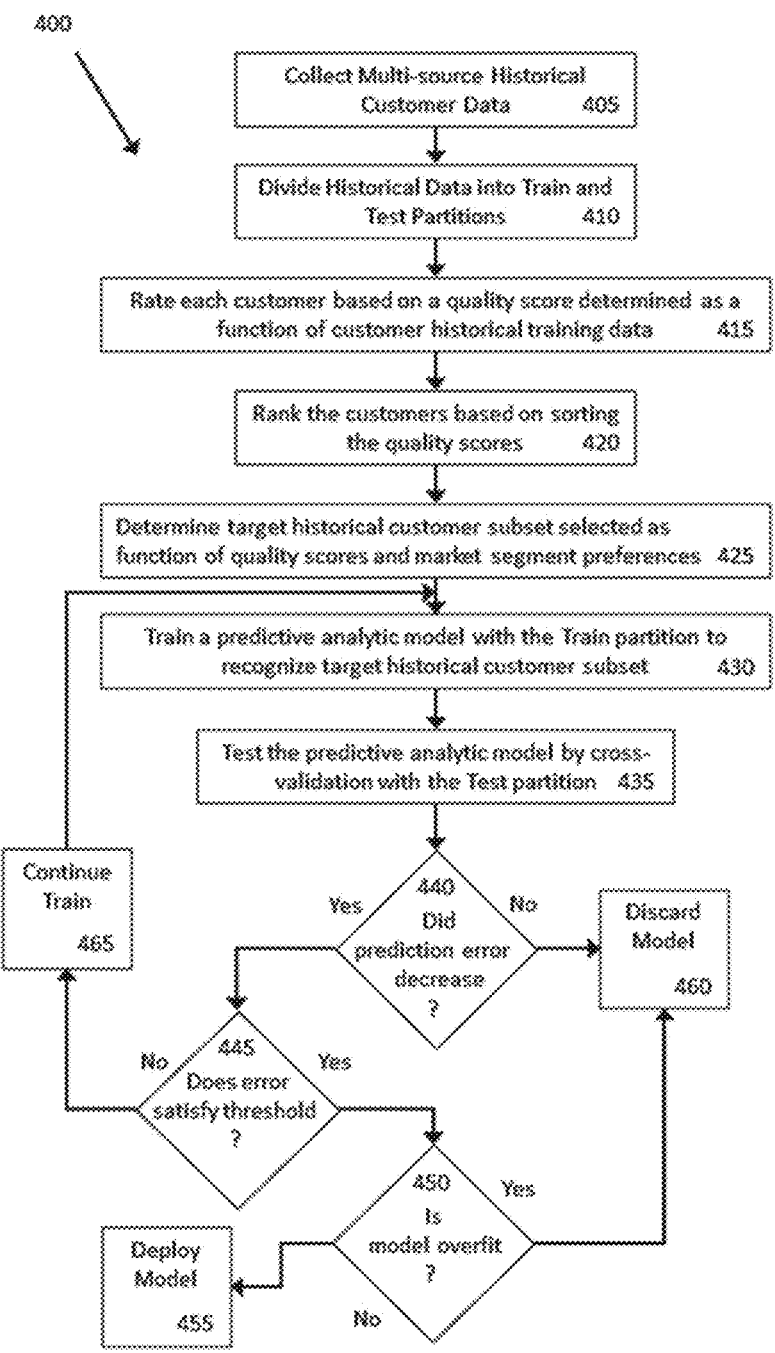

Collect Multi-source Historical Customer Data     405

Divide Historical Data into Train and Test Partitions     410

Rate each customer based on a quality score determined as a function of customer historical training data     415

Rank the customers based on sorting the quality scores     420

Determine target historical customer subset selected as function of quality scores and market segment preferences     425

Train a predictive analytic model with the Train partition to recognize target historical customer subset     430

Test the predictive analytic model by cross-validation with the Test partition     435

Continue Train     465

440 Did prediction error decrease ?

Yes     No

Discard Model     460

445 Does error satisfy threshold ?

No     Yes

450 Is model overfit ?

Yes

No

Deploy Model     455

FIG. 4

SYSTEM AND METHODS FOR CUSTOMER QUALITY PREDICTION

CROSS-REFERENCE TO RELATED APPLICATIONS

This application is a continuation-in-part and claims the benefit of both: (1) U.S. patent application Ser. No. 17/529,441, filed on Nov. 18, 2021, and entitled "System and Methods for Customer Quality Prediction" and (2) U.S. patent application Ser. No. 17/584,293, filed on Jan. 25, 2022, and entitled "System and Methods for Automated Property Management", the entire disclosures of each of which are incorporated herein by reference.

TECHNICAL FIELD

Various embodiments relate generally to predicting customer quality.

BACKGROUND

A customer is a consumer of goods or services. Some customers may prefer certain types of goods or services. For example, a particular customer may prefer a certain type of good or service more than another customer. In an illustrative example, customers may be divided into groups according to customer preferences. Customers having a particular preference may be considered as a group distinct from a customer group that does not share that preference. Some businesses provide goods or services to customers based on customer preferences.

Some businesses prefer customers having particular characteristics. For example, a business providing a product or service for which payment is made by installments over time may prefer a customer with an established record of making payments as scheduled. In various scenarios, a business that expends resources when a customer returns a product under warranty may prefer a customer with a low product return or complaint probability. In an illustrative example, a business may consider a customer with low product return or complaint probability as a high-quality customer. In some scenarios, a business may find such a high-quality customer to be more profitable than a customer of average or lower quality.

Some businesses serve customers with various product or service offerings over an extended period of time. For example, some customers may purchase product or service offerings from a business throughout a significant part of a human lifetime. In some scenarios, the higher cost of doing business with lower quality customers may accumulate to significant business loss over an extended period of time. A business desiring to increase profit by focusing on higher quality customers may expend significant resources assessing customer quality.

SUMMARY

Apparatus and associated methods relate to determining scores rating historical customer quality, utilizing artificial intelligence, machine learning and/or adaptive training models to create a predictive analytic model capable of recognizing historical customer quality determined as a function of ranking the scores, and predicting future customer quality based on the model. In an illustrative example, quality may be a vector quantity representing multi-source data. In some examples, the predictive analytic model may be trained to recognize a historical customer as a member of a subset of customers. For example, the model may be trained to recognize a customer subset selected based on a quality threshold characterizing the subset as good. In various embodiments, the predictive analytic model may utilize a neural network, permitting prediction based on weights adapted by machine learning techniques to learn which data sources are optimal predictors, with those predictors constantly updating in real time based on constant updated data points. Various examples may advantageously predict a customer quality trend as a function of time, permitting decisions based on predicted future customer quality.

Various embodiments may achieve one or more advantages. For example, some embodiments may improve a user's ease of access to more profitable customers. This facilitation may be a result of reducing the user's effort locating and evaluating potential customers in the user's market segment. In some embodiments, predictors useful to select high quality customers may be automatically determined for a user's customer base. Such automatic high quality customer predictor determination may improve a user's accuracy locating and evaluating potential customers, based on targeting higher quality customers identified using the predictors determined as most important to customer selection.

Some embodiments may improve a user's profit from longer-term relationships with customers purchasing goods or services over a substantial period of time. Such improved profit from longer-term customer relationships may be a result of reducing the user's overhead cost servicing customers, based on selecting higher quality customers having lower servicing cost over time. Various examples may improve the profitability of a user's business over time. This facilitation may be a result of identifying customers that may become a high quality customer in the future. For example, some embodiments may be configured to identify a customer trending to higher quality over time, and a user may present marketing and sales efforts to target that customer over time adjusted as a function of the identified trend, improving the accuracy or usefulness of advertising and sales.

The details of various embodiments are set forth in the accompanying drawings and the description below. Other features and advantages will be apparent from the description and drawings, and from the claims.

BRIEF DESCRIPTION OF THE DRAWINGS

FIG. 4 depicts an illustrative process flow of an embodiment Customer Ranking Engine (CRE) in an exemplary predictive analytic model training scenario, training a predictive analytic model to recognize historical customer quality determined as a function of ranking historical customer quality scores.

Like reference symbols in the various drawings indicate like elements.

DETAILED DESCRIPTION OF ILLUSTRATIVE EMBODIMENTS

To aid understanding, this document is organized as follows. First, predicting future customer quality based on ranked historical customer quality scores is briefly introduced with reference to FIG. 1. Second, with reference to FIGS. 2 and 3, the discussion turns to exemplary embodiment designs that illustrate various customer quality ranking implementations. Specifically, embodiment customer quality ranking computing device and network implementations are disclosed. Finally, with reference to FIGS. 4-6, exemplary Customer Ranking Engine (CRE) embodiment process flows and customer quality data operations illustrating predictive analytic model training and production scenarios are described, to explain improvements in customer quality prediction technology.

Figure 1:
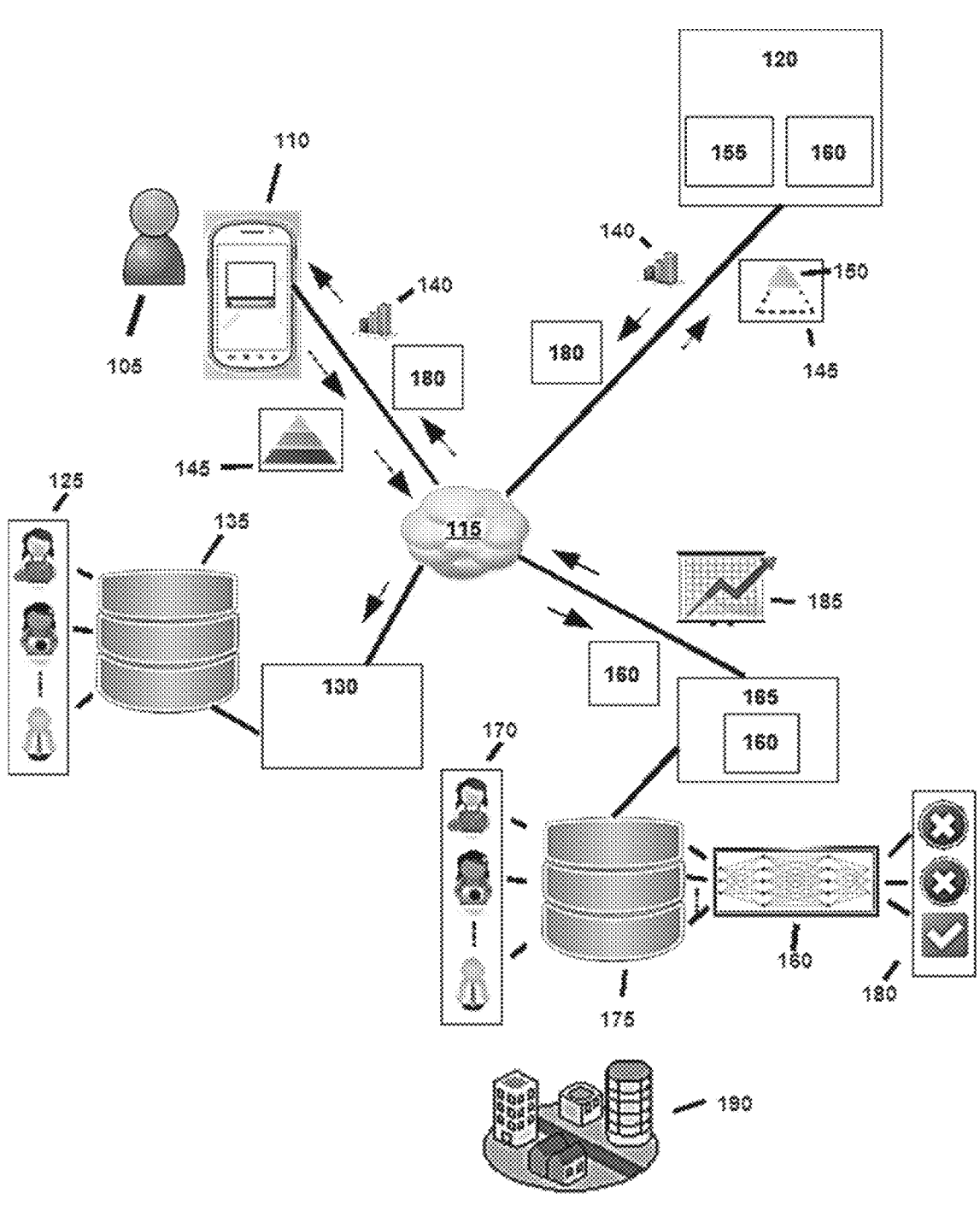
FIG. 1 depicts an exemplary customer ranking operation based on determining scores rating historical customer quality, training a predictive analytic model to recognize historical customer quality determined as a function of ranking the scores, and predicting future customer quality based on the model.

FIG. 1 depicts an exemplary customer ranking operation based on determining scores rating historical customer quality, training a predictive analytic model to recognize historical customer quality determined as a function of ranking the scores, and predicting future customer quality based on the model. In FIG. 1, the user 105 employs the mobile device 110 via the network cloud 115 to predict customer quality using the customer quality prediction server 120. In the depicted example, the customer quality prediction server 120 scores the historical customers 125 accessed via the customer experience server 130. In the illustrated example, the customer experience server 130 hosts the historical customer database 135 including data characterizing past customer behavior and past customer preferences. In the depicted example, the customer quality prediction server 120 determines customer score 140 for each historical customer 125. In the illustrated embodiment, each customer score 140 rates historical customer 125 quality. In the depicted embodiment, the customer score 140 of each historical customer 125 is based on multi-source data including multiple data components, wherein each data component may be weighted to govern the influence of each component on the customer score 140. In an illustrative example, weights may be determined dynamically by an adaptive unsupervised or semi-supervised algorithm, or by a user via a user interface. In the depicted embodiment, each customer score 140 includes multiple components, such as for example, credit score, income history, maintenance requests for a rental property, social media complaints or warnings, or complaints against a rental resident. In the illustrated embodiment, each customer score 140 is determined from the component data such that the totality of the data determining the customer score 140 is evaluated, wherein, for example, a customer with a low credit score, a history of on-time rent payment, a low rate of complaints, and a low rate of maintenance requests, may score higher than a customer with a high credit score. In the illustrated embodiment, the customer quality prediction server 120 divides the historical customers 125 into the customer groups 145 based on ranking each customer score 140. In the depicted embodiment, the user 105 selects via the mobile device 110 user interface the preferred customer group 150 as the target customer subset. In the illustrated example, the preferred customer group 150 represents the customer group with the highest quality, selected by the user. In the depicted example, the customer quality prediction server 120 trains a model selected from the baseline predictive analytic models 155 to recognize customers as members of the preferred customer group 150. In the illustrated embodiment, the customer quality prediction server 120 stores the trained predictive analytic model in the trained predictive analytic model 160 repository. In the depicted embodiment, the customer quality prediction server 120 deploys the trained predictive analytic model to the potential customer ranking server 165, to predict potential customers 170 quality based on current data characterizing the potential customers 170 behavior and preferences. In the illustrated example, the potential customers 170 quality is predicted based on collected data including data stored by the potential customer database 175. In various designs, real time, or live data, including, for example, location or social media activity may be employed to predict the potential customers 170 quality. In the depicted example, the potential customer ranking server 165 predicts the potential customers' quality 170 based on the potential customer database 175 and the trained predictive analytic model 160, to produce the potential customer ranking 180 based on the potential customer's quality and the input data. In the illustrated example, the trained predictive analytic model is a neural network. In various embodiments, the baseline predictive analytic models 155 and trained predictive analytic model 160 may include, for example, a decision tree, regression, support vector machine, or random forest model. In the depicted example, the potential customer ranking server 165 predicts the customer rating trend 185 based on determining a customer quality improvement rate (CQIR) defining a rate of quality improvement over time. In various examples, the CQIR may be the slope of a line through at least two points on a quality prediction line based on customer data and the trained predictive analytic model 160. In some examples, the customer rating trend 185 determined as a function of the CQIR may be used to identify a customer that may be a good or bad customer in the future, though the customer quality may be above or below a desirable quality threshold at a given point in time. Various embodiments may advantageously predict a potential customer's future quality, to promote avoidance of bad future customers and encourage engagement with good future customers, based on employing the customer rating trend 185 and CQIR to evaluate potential customer quality trends. In the illustrated example, the user 105 reviews the potential customer ranking 180 of the potential customers 170 via the mobile device 110 user interface. In the depicted example, the user 105 employs the mobile device 110 user interface to select rental residents for the multi-resident property 190, based on the potential customer ranking 180 accessed by the user 105 via the mobile device 110 user interface.

In alternative embodiments, the system may be configured to automate the selection of customers, in this case rental residents for a multi-resident or single-resident property, by identifying and selecting the highest ranked potential customers and offering them to engage in the consummation of a transaction. For instance, in the case of rental residents, the system could present the highest ranked potential customer with the ability to execute a rental agreement, which could be executed and recorded by the system (or alternatively executed and recorded manually). The system in these embodiments could be further configured to select one or more of the highest ranked customers, and provide the opportunity to execute the transaction to the highest ranked potential customer with an expiration trigger (e.g., timer based expiration trigger) of said offer, upon which if the expiration occurs the opportunity to execute the transaction is presented to the next highest ranked customer on a waitlist. Potential customers waiting for access to the opportunity may opt to be in or opt out of such waitlist. In still further embodiments, the system may be configured to concurrently offer the opportunity to one or more of the highest ranked customer, and the first to execute the transaction would be the selected customer.

In certain embodiments, the system may leverage a distributed ledger technology (DLT) to record and effect transactions. In certain embodiments, the DLT could be used to record executed transactions for the purposes of ensuring validity of such transactions. In further embodiments, DLTs could be utilized and implemented to work in conjunction with smart contract principles, and allow for auto-execution of certain points associated with a transaction. For instance, smart contracts could be utilized to automatically track ongoing or reoccurring payments (e.g., rent payments) and auto-execute certain terms upon breach of contract principles (e.g., sending late notices based on late rent payments). One of ordinary skill in the art would appreciate that there are numerous types of smart contracts that could be utilized, based on the type and nature of the transaction being executed, and further would appreciate that there are numerous auto-executing terms that could be implemented, based on the type and nature of the transaction, and embodiments of the present invention are contemplated for use with any appropriate type of smart contract and auto-executing terms.

Figure 2:
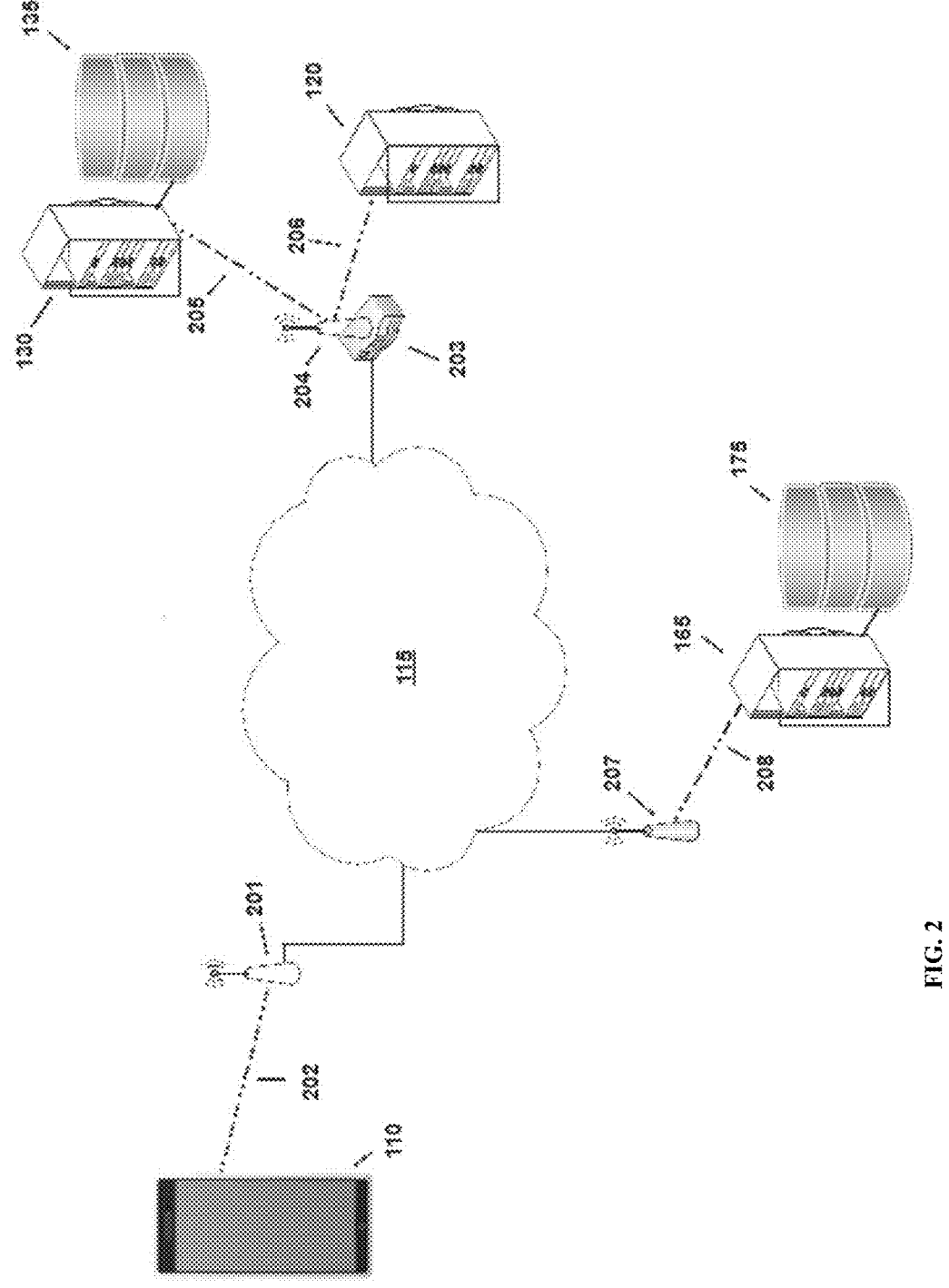
FIG. 2 depicts a schematic view of an exemplary customer ranking network configured to determine scores rating historical customer quality, train a predictive analytic model to recognize historical customer quality determined as a function of ranking the scores, and predict future customer quality based on the model.

FIG. 2 depicts a schematic view of an exemplary customer ranking network configured to determine scores rating historical customer quality, train a predictive analytic model to recognize historical customer quality determined as a function of ranking the scores, and predict future customer quality based on the model. In FIG. 2, according to an exemplary embodiment of the present disclosure, data may be transferred to the system, stored by the system and/or transferred by the system to users of the system across local area networks (LANs) or wide area networks (WANs). In accordance with various embodiments, the system may include numerous servers, data mining hardware, computing devices, or any combination thereof, communicatively connected across one or more LANs and/or WANs. One of ordinary skill in the art would appreciate that there are numerous manners in which the system could be configured, and embodiments of the present disclosure are contemplated for use with any configuration. Referring to FIG. 2, a schematic overview of a system in accordance with an embodiment of the present disclosure is shown. In the depicted embodiment, an exemplary system includes the embodiment customer quality prediction server 120 configured to determine scores rating historical customer quality, train a predictive analytic model to recognize historical customer quality determined as a function of ranking the scores, and predict future customer quality based on the model. In the illustrated embodiment, the customer experience server 130 is a computing device configured to host data representative of past customer behavior and past customer preferences retrievably stored via the historical customer database 135. In the depicted embodiment, the potential customer ranking server 165 is a computing device configured to host potential future customer behavior and preference data retrievably stored via the potential customer database 175. In the illustrated embodiment, the mobile device 110 is communicatively and operably coupled by the wireless access point 201 and the wireless link 202 with the network cloud 115 (for example, the Internet) to send, retrieve, or manipulate information in storage devices, servers, and network components, and exchange information with various other systems and devices via the network cloud 115. In the depicted example, the illustrative system includes the router 203 configured to communicatively and operably couple the customer experience server 130 to the network cloud 115 via the wireless access point 204 and the wireless communication link 205. In the illustrated example, the router 203 also communicatively and operably couples the customer quality prediction server 120 to the network cloud 115 via the wireless access point 204 and the wireless communication link 206. In the depicted embodiment, the potential customer ranking server 165 is communicatively and operably coupled with the network cloud 115 by the wireless access point 207 and the wireless communication link 208. In various examples, one or more of: the mobile device 110, the customer quality prediction server 120, the customer experience server 130, or the potential customer ranking server 165 may include an application server configured to store or provide access to information used by the system. In various embodiments, one or more application server may retrieve or manipulate information in storage devices and exchange information through the network cloud 115. In some examples, one or more of: the mobile device 110, the customer quality prediction server 120, the customer experience server 130, or the potential customer ranking server 165 may include various applications implemented as processor-executable program instructions. In some embodiments, various processor-executable program instruction applications may also be used to manipulate information stored remotely and process and analyze data stored remotely across the network cloud 115 (for example, the Internet). According to an exemplary embodiment, as shown in FIG. 2, exchange of information through the network cloud 115 or other network may occur through one or more high speed connections. In some cases, high speed connections may be over-the-air (OTA), passed through networked systems, directly connected to one or more network cloud 115 or directed through one or more router. In various implementations, one or more router may be optional, and other embodiments in accordance with the present disclosure may or may not utilize one or more router. One of ordinary skill in the art would appreciate that there are numerous ways any or all of the depicted devices may connect with the network cloud 115 for the exchange of information, and embodiments of the present disclosure are contemplated for use with any method for connecting to networks for the purpose of exchanging information. Further, while this application may refer to high speed connections, embodiments of the present disclosure may be utilized with connections of any useful speed. In an illustrative example, components or modules of the system may connect to one or more of: the mobile device 110, the customer quality prediction server 120, the customer experience server 130, or the potential customer ranking server 165 via the network cloud 115 or other network in numerous ways. For instance, a component or module may connect to the system i) through a computing device directly connected to the network cloud 115, ii) through a computing device connected to the network cloud 115 through a routing device, or iii) through a computing device connected to a wireless access point. One of ordinary skill in the art will appreciate that there are numerous ways that a component or module may connect to a device via network cloud 115 or other network, and embodiments of the present disclosure are contemplated for use with any network connection method. In various examples, one or more of: the mobile device 110, the customer quality prediction server 120, the customer experience server 130, or the potential customer ranking server 165 could include a personal computing device, such as a smartphone, tablet computer, wearable computing device, cloud-based computing device, virtual computing device, or desktop computing device, configured to operate as a host for other computing devices to connect to. In some examples, one or more communications means of the system may be any circuitry or other means for communicating data over one or more networks or to one or more peripheral device attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Figure 3:
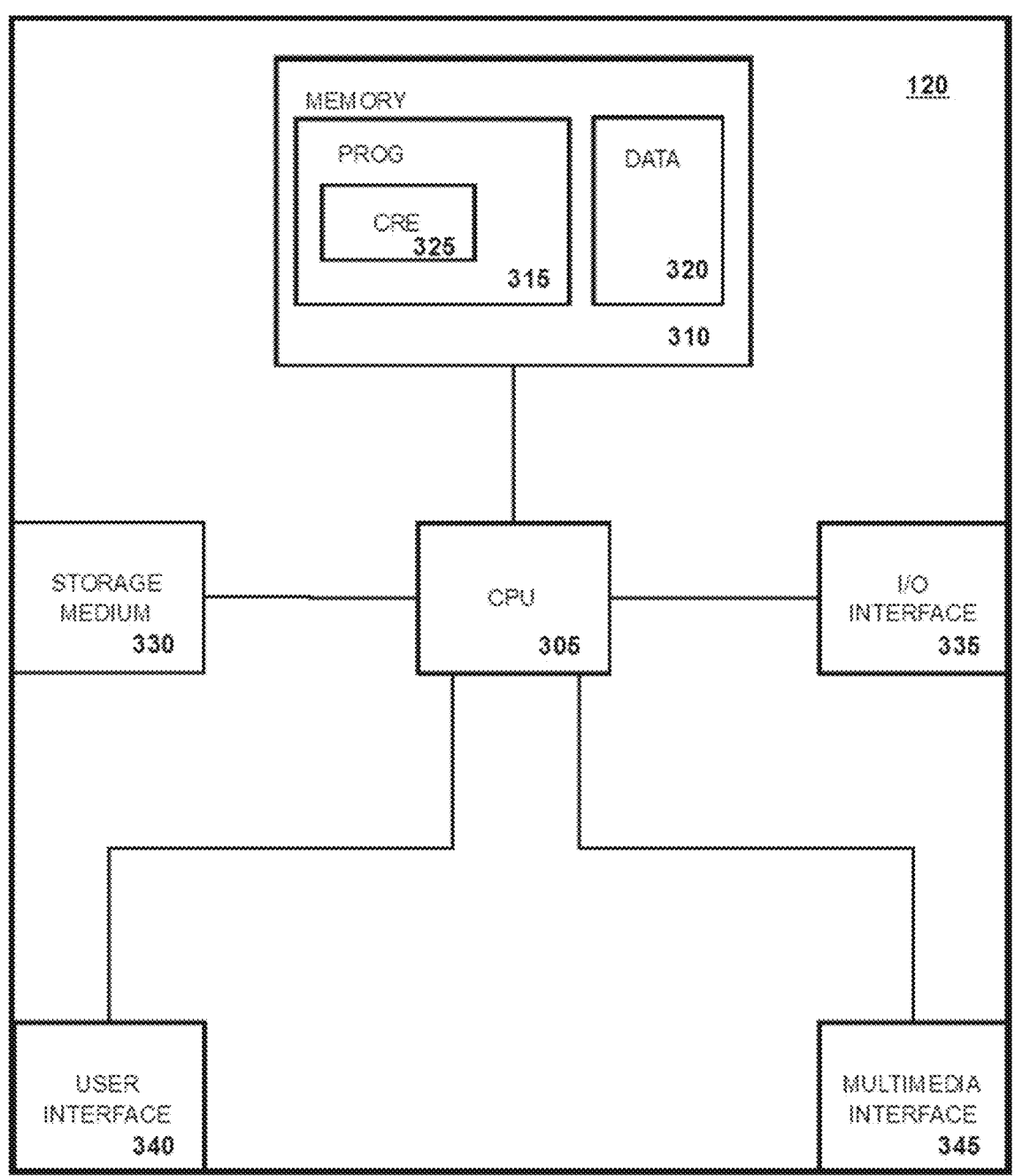
FIG. 3 depicts a structural view of an exemplary customer ranking computing device adapted with an embodiment Customer Ranking Engine (CRE) configured to determine scores rating historical customer quality, train a predictive analytic model to recognize historical customer quality determined as a function of ranking the scores, and predict future customer quality based on the model.

FIG. 3 depicts a structural view of an exemplary customer ranking computing device adapted with an embodiment Customer Ranking Engine (CRE) configured to determine scores rating historical customer quality, train a predictive analytic model to recognize historical customer quality determined as a function of ranking the scores, and predict future customer quality based on the model. In FIG. 3, the block diagram of the exemplary customer quality prediction server 120 includes processor 305 and memory 310. The processor 305 is in electrical communication with the memory 310. The depicted memory 310 includes program memory 315 and data memory 320. The depicted program memory 315 includes processor-executable program instructions implementing the CRE (Customer Ranking Engine) 325. In some embodiments, the illustrated program memory 315 may include processor-executable program instructions configured to implement an OS (Operating System). In various embodiments, the OS may include processor executable program instructions configured to implement various operations when executed by the processor 305. In some embodiments, the OS may be omitted. In some embodiments, the illustrated program memory 315 may include processor-executable program instructions configured to implement various Application Software. In various embodiments, the Application Software may include processor executable program instructions configured to implement various operations when executed by the processor 305. In some embodiments, the Application Software may be omitted. In the depicted embodiment, the processor 305 is communicatively and operably coupled with the storage medium 330. In the depicted embodiment, the processor 305 is communicatively and operably coupled with the I/O (Input/Output) interface 335. In the depicted embodiment, the I/O interface 335 includes a network interface. In various implementations, the network interface may be a wireless network interface. In some designs, the network interface may be a Wi-Fi interface. In some embodiments, the network interface may be a Bluetooth interface. In an illustrative example, the customer quality prediction server 120 may include more than one network interface. In some designs, the network interface may be a wireline interface. In some designs, the network interface may be omitted. In the depicted embodiment, the processor 305 is communicatively and operably coupled with the user interface 340. In various implementations, the user interface 340 may be adapted to receive input from a user or send output to a user. In some embodiments, the user interface 340 may be adapted to an input-only or output-only user interface mode. In various implementations, the user interface 340 may include an imaging display. In some embodiments, the user interface 340 may include an audio interface. In some designs, the audio interface may include an audio input. In various designs, the audio interface may include an audio output. In some implementations, the user interface 340 may be touch-sensitive. In some designs, the customer quality prediction server 120 may include an accelerometer operably coupled with the processor 305. In various embodiments, the customer quality prediction server 120 may include a GPS module operably coupled with the processor 305. In an illustrative example, the customer quality prediction server 120 may include a magnetometer operably coupled with the processor 305. In some embodiments, the user interface 340 may include an input sensor array. In various implementations, the input sensor array may include one or more imaging sensor. In various designs, the input sensor array may include one or more audio transducer. In some implementations, the input sensor array may include a radio-frequency detector. In an illustrative example, the input sensor array may include an ultrasonic audio transducer. In some embodiments, the input sensor array may include image sensing subsystems or modules configurable by the processor 305 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In various implementations, the depicted memory 310 may contain processor executable program instruction modules configurable by the processor 305 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In some embodiments, the input sensor array may include audio sensing subsystems or modules configurable by the processor 305 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In various implementations, the depicted memory 310 may contain processor executable program instruction modules configurable by the processor 305 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In the depicted embodiment, the processor 305 is communicatively and operably coupled with the multimedia interface 345. In the illustrated embodiment, the multimedia interface 345 includes interfaces adapted to input and output of audio, video, and image data. In some embodiments, the multimedia interface 345 may include one or more still image camera or video camera. In various designs, the multimedia interface 345 may include one or more microphone. In some implementations, the multimedia interface 345 may include a wireless communication means configured to operably and communicatively couple the multimedia interface 345 with a multimedia data source or sink external to the customer quality prediction server 120. In various designs, the multimedia interface 345 may include interfaces adapted to send, receive, or process encoded audio or video. In various embodiments, the multimedia interface 345 may include one or more video, image, or audio encoder. In various designs, the multimedia interface 345 may include one or more video, image, or audio decoder. In various implementations, the multimedia interface 345 may include interfaces adapted to send, receive, or process one or more multimedia stream. In various implementations, the multimedia interface 345 may include a GPU. In some embodiments, the multimedia interface 345 may be omitted. Useful examples of the illustrated customer quality prediction server 120 include, but are not limited to, personal computers, servers, tablet PCs, smartphones, or other computing devices. In some embodiments, multiple customer quality prediction server 120 devices may be operably linked to form a computer network in a manner as to distribute and share one or more resources, such as clustered computing devices and server banks/farms. Various examples of such general-purpose multi-unit computer networks suitable for embodiments of the disclosure, their typical configuration and many standardized communication links are well known to one skilled in the art, as explained in more detail in the foregoing FIG. 2 description. In some embodiments, an exemplary customer quality prediction server 120 design may be realized in a distributed implementation. In an illustrative example, some customer quality prediction server 120 designs may be partitioned between a client device, such as, for example, a phone, and, a more powerful server system, as depicted, for example, in FIG. 2. In various designs, a customer quality prediction server 120 partition hosted on a PC or mobile device may choose to delegate some parts of computation, such as, for example, machine learning or deep learning, to a host server. In some embodiments, a client device partition may delegate computation-intensive tasks to a host server to take advantage of a more powerful processor, or to offload excess work. In an illustrative example, some devices may be configured with a mobile chip including an engine adapted to implement specialized processing, such as, for example, neural networks, machine learning, artificial intelligence, image recognition, audio processing, or digital signal processing. In some embodiments, such an engine adapted to specialized processing may have sufficient processing power to implement some features. However, in some embodiments, an exemplary customer quality prediction server 120 may be configured to operate on a device with less processing power, such as, for example, various gaming consoles, which may not have sufficient processor power, or a suitable CPU architecture, to adequately support customer quality prediction server 120. Various embodiment designs configured to operate on a such a device with reduced processor power may work in conjunction with a more powerful server system.

FIG. 4 depicts an illustrative process flow of an embodiment Customer Ranking Engine (CRE) in an exemplary predictive analytic model training scenario, training a predictive analytic model to recognize historical customer quality determined as a function of ranking historical customer quality scores. The method depicted in FIG. 4 is given from the perspective of the CRE 325 implemented via processor-executable program instructions executing on the customer quality prediction server 120 processor 305, depicted in FIG. 3. In various embodiments, the method depicted in FIG. 4 may also be understood as from the perspective of processor-executable program instructions executing on one or more processor configured in the mobile device 110, depicted in FIGS. 1 and 2.

In various embodiments, the method depicted in FIG. 4 may utilize various machine learning (ML) and/or artificial intelligence (AI) systems, including, but not limited to, machine learning models trained on various amounts of test and training data, neural networks (e.g., Artificial Neural Networks (ANN), Convolution Neural Networks (CNN), Recurrent Neural Networks (RNN)), deep learning models and deep-learning-based generative models (e.g., generative adversarial networks (GANs)). One of ordinary skill in the art would appreciate that there are numerous types of ML and AI systems that could be used for the purposes detailed herein, and embodiments of the present invention are contemplated for use with any such ML or AI system. In the illustrated embodiment, the CRE 325 executes as program instructions on the processor 305 configured in the CRE 325 host customer quality prediction server 120, depicted in at least FIG. 1, FIG. 2, and FIG. 3. In some embodiments, the CRE 325 may execute as a cloud service communicatively and operatively coupled with system services, hardware resources, or software elements local to and/or external to the CRE 325 host customer quality prediction server 120.

The depicted method 400 begins at step 405 with the processor 305 collecting multi-source historical customer data. In the illustrated example, the multi-source historical customer data characterizes historical customers' behavior and preferences. In some implementations, the multi-source historical customer data may be comprised of credit score, income, and on-time payment history. In various designs, the historical customers may be historical rental property residents. In some examples, the multi-source historical data may characterize rental property resident behavior based on, for example, maintenance requests, maintenance problem severity, complaints against the resident, income, income projection, credit score, social media status, credit score, or the cost of a particular rental unit.

Then, the method continues at step 410 with the processor 305 dividing the historical data into Train and Test partitions. Then, the method continues at step 415 with the processor 305 rating each customer based on a quality score determined as a function of customer historical training data. In various embodiments, the rating of each customer is done using an implementation of a ML or AI system, where the train and test partitions are used in such ML or AI system to generate one or more of the quality score or customer rating. Other embodiments may utilize other forms of ML or AI as detailed elsewhere herein. Then, the method continues at step 420 with the processor 305 ranking the customers based on sorting the quality scores.

Then, the method continues at step 425 with the processor 305 determining a target historical customer subset selected as a function of the quality scores and market segment preferences. In some embodiments, the target historical customer subset may be selected based on a user indication received through a user interface.

Then, the method continues at step 430 with the processor 305 training a predictive analytic model with the Train partition to recognize customer members of the target historical customer subset. In certain embodiments, the predictive analytic model may comprise one or more of an ML or AI system that is configured to use the Train partition in order to do the recognition portion, such as via an implementation of a neural network configured to do so.

Then, the method continues at step 435 with the processor 305 testing the predictive analytic model by based on cross-validation with the Test partition. In certain embodiments, the predictive analytic model may comprise one or more of an ML or AI system that is configured to use the Test partition in order to do the cross-validation portion, such as via an implementation of a neural network configured to do so. Other embodiments may utilize other forms of ML or AI as detailed elsewhere herein.

At step 440, the processor 305 performs a test to determine if the model prediction error decreased, based on the cross-validation by the processor 305 at step 435. In certain embodiments, the predictive analytic model may comprise one or more of an ML or AI system that is configured to perform the test and determine whether the model prediction error decrease, such as via an implementation of a neural network configured to do so. Other embodiments may utilize other forms of ML or AI as detailed elsewhere herein.

Upon a determination by the processor 305 at step 440 the prediction error decreased, the method continues at step 445 with the processor 445 performing a test to determine if the model prediction error satisfies a predetermined model prediction error threshold. In certain embodiments, the model prediction error test may be performed by one or more of an ML or AI system that is configured to determine whether the prediction error threshold is satisfied, such as via an implementation of a neural network configured to do so. Other embodiments may utilize other forms of ML or AI as detailed elsewhere herein.

Upon a determination by the processor 305 at step 445 the model prediction error satisfies the predetermined model prediction error threshold, the method continues at step 450 with the processor 305 performing a test to determine if the model is overfit determined as a function of the error in the cross-validation performed by the processor 305 at step 435. In certain embodiments, the model overfit test may be performed by one or more of an ML or AI system that is configured to determine whether overfitting is occurring, such as via an implementation of a neural network configured to do so. Other embodiments may utilize other forms of ML or AI as detailed elsewhere herein.

Upon a determination by the processor 305 at step 450 the model is not overfit, the method continues at step 455 with the processor 305 deploying the trained predictive analytic model for production prediction operation, to provide a user with predictive analytic output determined as a function of the model and prediction target data input. In certain embodiments, the deployed trained predictive analytic model may be used in an ML or AI system that is configured to provide users with predictive analytic output in accordance with this method. Other embodiments may utilize other forms of ML or AI as detailed elsewhere herein.

Upon a determination by the processor 305 at step 440 the prediction error did increase, and a determination by a processor 305 at step 445 the error does not satisfy the predetermined model prediction error threshold, the method continues at step 465 with the processor 305 continuing again to train the predictive analytic model at step 430. Upon a determination by the processor 305 at step 440 the prediction error did not increase, or a determination by the processor 305 at step 450 the model is overfit, the method continues at step 460 with the processor 305 discarding the model. In various embodiments, the method may repeat.

Figure 5:
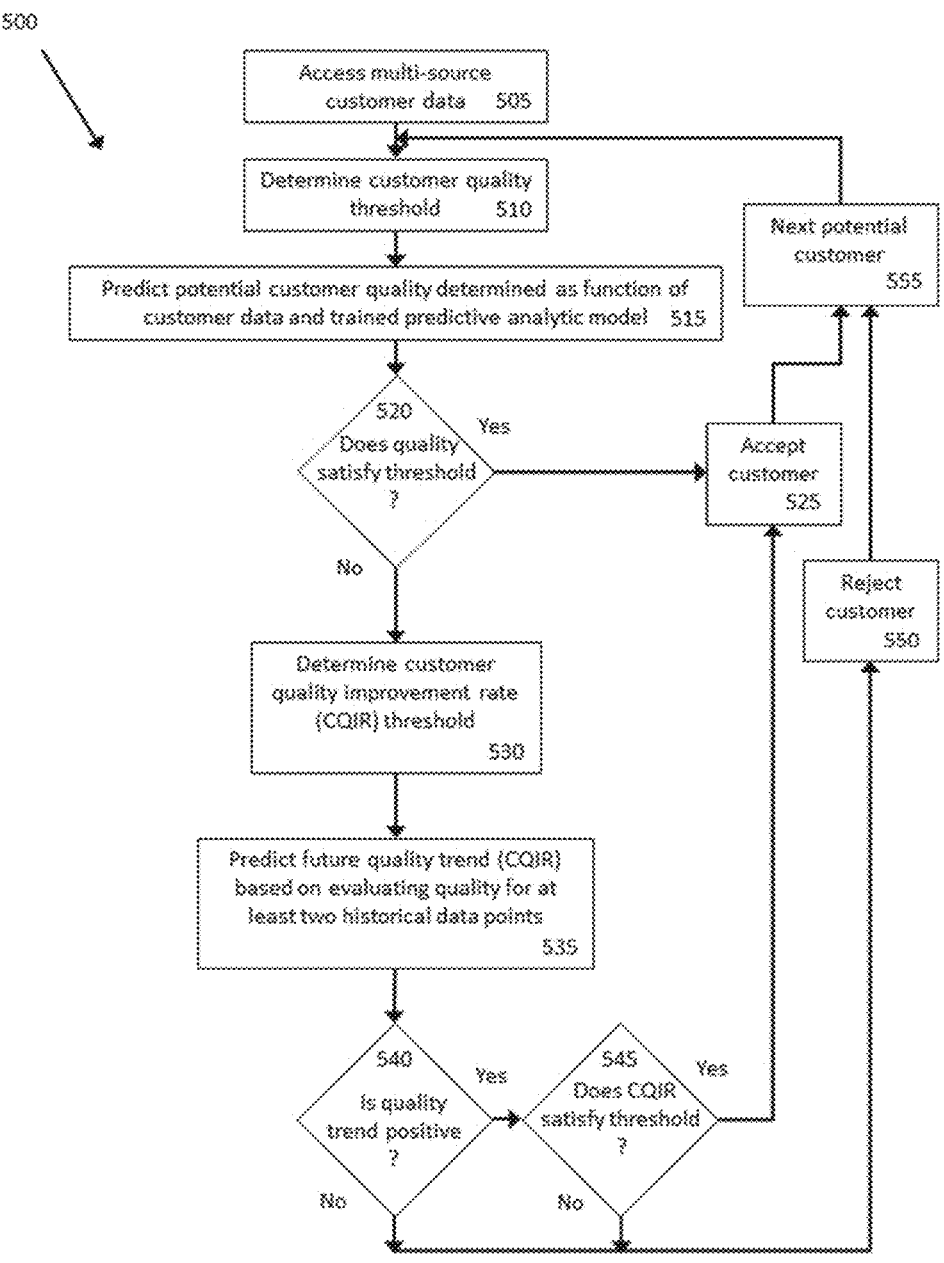
FIG. 5 depicts an illustrative process flow of an embodiment Customer Ranking Engine (CRE) in an exemplary predictive analytic model production scenario, predicting future customer quality estimated as a function of a predictive analytic model trained to recognize historical customer quality determined as a function of ranking historical customer quality scores.

FIG. 5 depicts an illustrative process flow of an embodiment Customer Ranking Engine (CRE) in an exemplary predictive analytic model production scenario, predicting future customer quality estimated as a function of a predictive analytic model trained to recognize historical customer quality determined as a function of ranking historical customer quality scores. The method depicted in FIG. 5 is given from the perspective of the CRE 325 implemented via processor-executable program instructions executing on the customer quality prediction server 120 processor 305, depicted in FIG. 3. In various embodiments, the method depicted in FIG. 5 may also be understood as from the perspective of processor-executable program instructions executing on one or more processor configured in the mobile device 110, depicted at least in FIGS. 1 and 2. In the illustrated embodiment, the CRE 325 executes as program instructions on the processor 305 configured in the CRE 325 host customer quality prediction server 120, depicted in at least FIG. 1, FIG. 2, and FIG. 3. In some embodiments, the CRE 325 may execute as a cloud service communicatively and operatively coupled with system services, hardware resources, or software elements local to and/or external to the CRE 325 host customer quality prediction server 120. In various embodiments, the method depicted in FIG. 5 may utilize various machine learning and/or artificial intelligence systems, including, but not limited to, machine learning models trained on various amounts of test and training data, neural networks (e.g., Artificial Neural Networks (ANN), Convolution Neural Networks (CNN), Recurrent Neural Networks (RNN)), deep learning models and deep-learning-based generative models (e.g., generative adversarial networks (GANs)). One of ordinary skill in the art would appreciate that there are numerous types of ML and AI systems that could be used for the purposes detailed herein, and embodiments of the present invention are contemplated for use with any such ML or AI system.

The depicted method 500 begins at step 505 with the processor 305 accessing multi-source customer data. In the depicted example, the multi-source customer data characterizes potential customers' behavior and preferences. In various embodiments, the multi-source customer data may include credit score, income, and on-time payment history. In some examples, the potential customers may be potential rental property residents. In an illustrative example, the multi-source data may characterize rental property resident behavior based on, for example, maintenance request history, maintenance request severity, complaints against the resident, income, income projection, credit score, social media status, credit score, or the cost of a particular rental unit.

Then, the method continues at step 510 with the processor 305 determining a customer quality threshold. In some examples, the processor 305 may determine the customer quality threshold based on user input selecting the customer quality threshold. In an illustrative example, the customer quality threshold may be determined by the processor 305 as a function of business goals or market segment preferences provided by the user.

Then, the method continues at step 515 with the processor 305 predicting potential customer quality determined as a function of customer data and a trained predictive analytic model. In certain embodiments, the trained predictive analytic model may comprise one or more of an ML or AI system that is configured to use a trained data model in order to do the determination of potential customer quality, such as via an implementation of a neural network configured to do so. Other embodiments may utilize other forms of ML or AI as detailed elsewhere herein.

At step 520 the processor 305 performs a test to determine if the customer quality predicted by the processor 305 at step 515 satisfies the customer quality threshold determined by the processor 305 at step 510. In certain embodiments, the determination of whether a customer satisfies the quality threshold may be completed, or assisted in completion, by one or more of an ML or AI system that is configured to make such a determination, such as through the use of a trained predictive analytic system implemented via a neural network configured to do so. Other embodiments may utilize other forms of ML or AI as detailed elsewhere herein. Upon a determination by the processor 305 at step 520 the predicted quality satisfies the threshold, the method continues at step 525 with the processor 305 accepting the customer.

Upon a determination by the processor 305 at step 520 the predicted quality does not satisfy the threshold, the method continues at step 530 with the processor 305 determining a customer quality improvement rate (CQIR) threshold. In the illustrated embodiment, the CQIR defines a rate of quality improvement over time. In various examples, the CQIR may be the slope of a line through at least two points on a quality prediction line determined by the processor 305 based on customer data and the predictive analytic model. In certain embodiments, the predictive analytic model may comprise one or more of an ML or AI system that is configured to use a trained data model in order to do the determination of CQIR threshold, such as via an implementation of a neural network configured to do so. Other embodiments may utilize other forms of ML or AI as detailed elsewhere herein.

In some examples, the CQIR may be used to identify a customer that may be a good or bad customer in the future, although the customer may be above or below a quality threshold at a given point in time. Various embodiments may advantageously predict a potential customer's future quality, to promote avoidance of bad future customers and encourage engagement with good future customers, based on employing CQIR to evaluate potential customer quality trends.

Then, the method continues at step 535 with the processor 535 predicting the customer's future quality trend (CQIR) based on evaluating predicted quality for at least two historical data points. At step 540, the processor 305 performs a test to determine if the customer's quality trend is positive. Upon a determination by the processor 305 at step 540 the customer's quality trend is positive, the method continues at step 545 with the processor 305 performing a test to determine if the customer's CQIR determined by the processor 305 at step 535 satisfies the CQIR threshold determined by the processor 305 at step 530. In certain embodiments, the determination of whether the CQIR has satisfied the threshold may be completed by one or more of an ML or AI system that is configured to use the predictive analytic model to make such a determination, such as via an implementation of a neural network configured to do so. Other embodiments may utilize other forms of ML or AI as detailed elsewhere herein.

Upon a determination by the processor 305 at step 540 the customer's quality trend is not positive, or a determination by the processor 305 at step 545 the customer's CQIR does not satisfy the CQIR threshold, the method continues at step 550 with the processor 305 rejecting the customer, and the method continues at step 555 with the processor 305 predicting the next potential customer quality, beginning again at step 510 with the processor 305 determining a customer quality threshold. Upon a determination by the processor 305 at step 545 the customer's CQIR satisfies the CQIR threshold, the method continues at step 525 with the processor 305 accepting the customer. Then, the method continues at step 555 with the processor 305 predicting the next potential customer quality, beginning again at step 510 with the processor 305 determining a customer quality threshold. In various embodiments, the method may terminate.

Figures 6A, 6B, 6C, 6D, 6E:
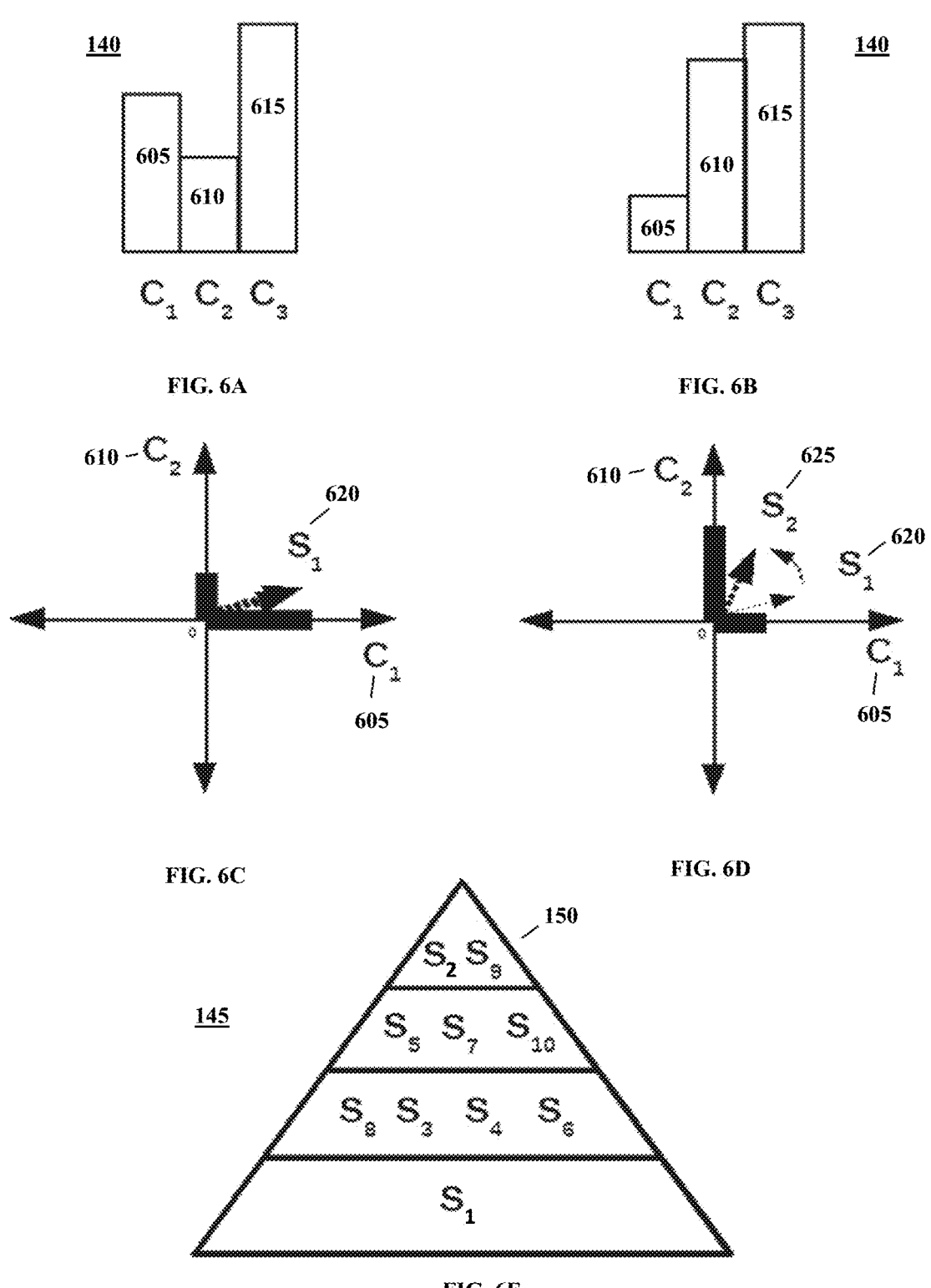
FIGS. 6A-6E together depict graphical views illustrating various exemplary customer quality data operations, in accordance with various embodiments of the disclosure.

FIGS. 6A-6E together depict graphical views illustrating various exemplary customer quality data operations, in accordance with various embodiments of the disclosure. In FIG. 6A, the exemplary customer score 140 includes the multi-source data component $C_1$ maintenance requests 605, the multi-source data component $C_2$ credit score 610, and the multisource data component $C_3$ income 615. In FIG. 6B, the depicted multi-source data component $C_1$ maintenance requests 605 is illustrated showing a lower value than depicted in FIG. 6A. In addition, in FIG. 6B, the depicted multi-source data component $C_2$ credit score 610 is illustrated showing a higher value than depicted in FIG. 6A. In FIG. 6C, an example depicting an embodiment technique to evaluate a combination of multi-source data in totality for a customer ranking score is illustrated. In FIG. 6C, the customer score $S_1$ 620 is determined based on the component values illustrated by FIG. 6A, as the resultant of the multi-source data component $C_1$ maintenance requests 605 and the multi-source data component $C_2$ credit score 610. In FIG. 6D, the customer score $S_2$ 625 is determined based on the component values illustrated by FIG. 6B, as the resultant of the multi-source data component $C_1$ maintenance requests 605 and the multi-source data component $C_2$ credit score 610. In the depicted example, the lower maintenance requests of the multi-source data component $C_1$ depicted by FIG. 6B outweigh other data components, providing the higher customer ranking determined as a function of the resultant vector angle for customer score $S_2$ 625 in FIG. 6D. In FIG. 6E, the exemplary customer groups 145 depict ranking the customer score 140 examples of FIG. 6A and FIG. 6B based on the angle of the resultant vector angle of each customer score. In the depicted example, the customer score $S_2$ 625 is ranked in the preferred customer group 150 as part of the target customer subset. Although the depicted example determines rank based on two-dimensional component scores, the technique disclosed may be extended to any dimensional order, as the skilled artisan would recognize.

Although various embodiments have been described with reference to the Figures, other embodiments are possible.

In the Summary above and in this Detailed Description, and the Claims below, and in the accompanying drawings, reference is made to particular features of various embodiments of the invention. It is to be understood that the disclosure of embodiments of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

In the present disclosure, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

In various embodiments, elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of embodiments of the invention, even those disclosed solely in combination with other features of embodiments of the invention, may be combined in any configuration excepting those readily apparent to the person skilled in the art as nonsensical. Likewise, use of the singular and plural is solely for the sake of illustration and is not to be interpreted as limiting.

In the present disclosure, all embodiments where "comprising" is used may have as alternatives "consisting essentially of," or "consisting of" In the present disclosure, any method or apparatus embodiment may be devoid of one or more process steps or components. In the present disclosure, embodiments employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an embodiment "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Many suitable methods and corresponding materials to make each of the individual parts of embodiment apparatus are known in the art. According to an embodiment of the present invention, one or more of the parts may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described herein-above may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f). Elements recited in means-plus-function format are intended to be construed in accordance with 35 U.S.C. § 112 (f).

Recitation in a claim of the term "first" with respect to a feature or element does not necessarily imply the existence of a second or additional such feature or element.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects may lie in a combination of fewer than all features of any single foregoing disclosed embodiment. Thus, the claims following this Detailed Description are hereby expressly incorporated into this Detailed Description, with each claim standing on its own as a separate embodiment. This disclosure is to be interpreted as including all permutations of the independent claims with their dependent claims.

According to an embodiment of the present invention, the system and method may be accomplished through the use of one or more computing devices. As depicted, for example, at least in FIG. 1, FIG. 2, and FIG. 3, one of ordinary skill in the art would appreciate that an exemplary system appropriate for use with embodiments in accordance with the present application may generally include one or more of a Central processing Unit (CPU), Random Access Memory (RAM), a storage medium (e.g., hard disk drive, solid state drive, flash memory, cloud storage), an operating system (OS), one or more application software, a display element, one or more communications means, or one or more input/output devices/means. Examples of computing devices usable with embodiments of the present invention include, but are not limited to, proprietary computing devices, personal computers, mobile computing devices, tablet PCs, mini-PCs, servers or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In various embodiments, communications means, data store(s), processor(s), or memory may interact with other components on the computing device, in order to effect the provisioning and display of various functionalities associated with the system and method detailed herein. One of ordinary skill in the art would appreciate that there are numerous configurations that could be utilized with embodiments of the present invention, and embodiments of the present invention are contemplated for use with any appropriate configuration.

According to an embodiment of the present invention, the communications means of the system may be, for instance, any means for communicating data over one or more networks or to one or more peripheral devices attached to the system. Appropriate communications means may include, but are not limited to, circuitry and control systems for providing wireless connections, wired connections, cellular connections, data port connections, Bluetooth connections, or any combination thereof. One of ordinary skill in the art would appreciate that there are numerous communications means that may be utilized with embodiments of the present invention, and embodiments of the present invention are contemplated for use with any communications means.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a sequence of computational instructions or program instructions. It will be appreciated that a programmable apparatus (i.e., computing device) can receive such a computer program and, by processing the computational instructions thereof, produce a further technical effect.

A programmable apparatus may include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A process to determine customer value, the process comprising:
    determining, via a customer ranking engine (CRE), comprising a machine learning or artificial intelligence system comprising program instructions, stored in a memory, configured to execute on one or more processors in the CRE, wherein the memory is in electrical communication with the one or more processors and comprises a program memory and a data memory, scores rating historical customer quality, wherein each score is determined from a plurality of multi-source data components including at least credit score, income history, and maintenance request data, and wherein each score is a vector quantity determined as a resultant of the multi-source data components;

determining, via the one or more processors, a customer quality threshold, wherein the customer quality threshold is based at least in part on quality scores and market segment preferences and indications received from the user via a user interface;

retrieving, via the one or more processors, historical customer data from multiple sources;

dividing, via the one or more processors, historical customer data into at least a train partition and test partition;

rating, via the one or more processors, a plurality of customers based on a quality score, wherein said quality score is based at least in part on a function of historical training data associated with said plurality of customers;

determining, via the one or more processors, a subset of customers from said plurality of customers, wherein said subset of customers comprises one or more customers that do not meet the customer quality threshold;

training, via the one or more processors, a neural network, to make determinations as to whether one or more customers of the plurality of customers satisfy the customer quality threshold, wherein said training of the neural network is based at least in part on cross-validation with the test partition, wherein training comprises iteratively adjusting weights of the neural network using the train partition until a model prediction error of the neural network satisfies a predetermined model prediction error threshold, and wherein the model prediction error threshold is determined based on the cross-validation with the test partition;

testing, via the one or more processors, the neural network, to recognize historical customer quality determined as a function of ranking the quality scores, and determining, based on the cross-validation, whether the neural network is overfit by evaluating a function of error in the cross-validation performed by the processor, and upon a determination that the neural network is overfit, discarding the neural network;

upon a determination that the neural network is not overfit, deploying the trained neural network for production prediction operation;

determining, via the one or more processors, a customer quality improvement rate (CQIR) for one or more customers of the subset of customers, and a CQIR threshold, wherein the CQIR is a slope of a quality prediction line through at least two points on a quality prediction determined by the processor based on customer data and an output of the trained neural network, the slope defining a rate at which a customer quality changes over time and the CQIR threshold is a rate of change of CQIR required to determine whether an individual customer meets desired potential customer quality trends, wherein the CQIR and CQIR threshold are based at least in part on use of said trained neural network;

predicting future customer quality for a first set of customers from said subset of customers based at least in part on said CQIR and said CQIR threshold and said trained neural network; and rejecting said first set of customers from said plurality of customers whose CQIR does not satisfy the CQIR threshold, thereby automatically filtering customers from a pool of potential customers based on the deployed trained neural network.

2. The process of claim 1, wherein the scores further comprise multi-source data.

3. The process of claim 1, wherein customer quality further comprises a vector quantity.

4. The process of claim 1, wherein rating historical customer quality further comprises each score determined as a combination of multiple data components.

5. The process of claim 1, wherein training the neural network further comprises partitioning historical data into train and test partitions.

6. The process of claim 1, wherein training the neural network further comprises cross validation.

7. The process of claim 1, wherein training the neural network further comprises a test to determine if the model prediction error is less than a predetermined maximum.

8. The process of claim 1, wherein training the neural network further comprises a test to determine if the neural network is overfit based on cross-validation.

9. The process of claim 1, wherein determining scores further comprises normalizing data.

10. A process to determine customer value, the process comprising:

determining, via a customer ranking engine (CRE), comprising a machine learning or artificial intelligence system comprising program instructions, stored in a memory, configured to execute on one or more processors in the CRE, wherein the memory is in electrical communication with the one or more processors and comprises a program memory and a data memory, scores rating historical customer quality, wherein the scores are determined as a function of multi-source data, and wherein customer quality is a vector quantity determined as a function of a plurality of multi-source data components;

training, via the one or more processors, a neural network, to recognize historical customer quality determined as a function of ranking the scores, wherein training the neural network includes partitioning historical data into train and test partitions, and, training the neural network using the train partition until the model prediction error of the neural network satisfies a predetermined threshold, wherein training comprises iteratively adjusting weights of the neural network and evaluating the model prediction error after each iteration, and upon a determination that the model prediction error did increase, discarding the neural network;

testing, via the one or more processors, the predictive analytic model, via the neural network, wherein testing the neural network includes cross-validation based on the test partition, and determining whether the neural network is overfit based on a function of error in the cross-validation, and upon a determination that the neural network is not overfit, deploying the trained neural network for production prediction operation;

determining, via the one or more processors, a customer quality improvement rate (CQIR) and a CQIR threshold, wherein the CQIR is a slope of a quality prediction line through at least two points determined by the processor based on customer data and the neural network, the slope defining a rate at which customer quality changes over time and the CQIR threshold is a rate of change of CQIR required to determine whether an individual customer meets desired potential customer quality trends, wherein the CQIR and CQIR threshold are based at least in part on use of said trained neural network; and, predicting, via the one or more processors, future customer quality based at least in part on the CQIR and said CQIR threshold and the trained neural network, and automatically rejecting customers whose CQIR does not satisfy the CQIR threshold.

11. The process of claim 10, wherein the neural network further comprises a random forest ensemble layer integrated with the neural network.

12. The process of claim 10, wherein the neural network further comprises a decision tree component integrated with the neural network.

13. The process of claim 10, wherein the neural network further comprises a Bayesian classifier component integrated with the neural network.

14. The process of claim 10, wherein the train partition further comprises labeled data.

15. The process of claim 10, wherein ranking customer quality further comprises evaluating an angle determined by vector analysis of data components.

16. A process to determine customer value, the process comprising:

determining, via a customer ranking engine (CRE), comprising a machine learning or artificial intelligence system comprising program instructions, stored in a memory, configured to execute on one or more processors in the CRE, wherein the memory is in electrical communication with the one or more processors and comprises a program memory and a data memory, scores rating historical customer quality, wherein the scores are determined as a function of multi-source data components, wherein customer quality is a vector quantity determined as a function of a plurality of the multi-source data components;

training, via the one or more processors, a neural network to recognize historical customer quality determined as a function of ranking the scores, wherein training the neural network includes partitioning historical data into train and test partitions, and training the predictive analytic model using the train partition until the model prediction error of the neural network satisfies a pre-determined threshold, wherein training comprises iteratively adjusting weights of the neural network and evaluating the model prediction error after each iteration, and wherein ranking the scores further comprises evaluating an angle determined by vector analysis of data components;

testing the neural network, wherein testing the model includes cross-validation based on the test partition, and determining whether the neural network is overfit based on a function of error in the cross-validation, and upon a determination that the neural network is not overfit, deploying the trained neural network for production prediction operation;

determining a customer quality improvement rate (CQIR) for one or more customers, and a CQIR threshold, wherein the CQIR is a slope of a quality prediction line through at least two points determined by the processor based on customer data and an output of the trained neural network, the slope defining a rate at which a customer quality changes over time and the CQIR threshold is a rate of change of CQIR required to determine whether an individual customer meets desired potential customer quality trends, wherein the CQIR and CQIR threshold are based at least in part on use of said trained neural network; and predicting future customer quality based at least in part on the CQIR and the trained neural network, wherein future customer quality is determined as a trend based on predicted quality evaluated for at least two points in time, and automatically rejecting customers whose CQIR does not satisfy the CQIR threshold, thereby filtering customers from a pool of potential customers based on the deployed trained neural network.

17. The process of claim 16, wherein the future customer quality trend is determined as a function of the slope of a quality prediction line.

18. The process of claim 16, wherein the future customer quality trend is determined as a function of CQIR.

19. The process of claim 16, wherein customer quality is determined as a function of input from a property management system based on image data.

* * * * *